United States Patent
Zhu

(10) Patent No.: US 11,790,344 B2
(45) Date of Patent: *Oct. 17, 2023

(54) METHOD AND APPARATUS FOR DISPLAYING IDENTIFICATION CODE OF APPLICATION

(71) Applicant: Advanced New Technologies Co., Ltd., Grand Cayman (KY)

(72) Inventor: Dengchao Zhu, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/674,633

(22) Filed: Feb. 17, 2022

(65) Prior Publication Data

US 2022/0172193 A1 Jun. 2, 2022

Related U.S. Application Data

(63) Continuation of application No. 16/959,637, filed as application No. PCT/CN2019/073573 on Jan. 29, 2019, now Pat. No. 11,282,064.

(30) Foreign Application Priority Data

Feb. 12, 2018 (CN) .......................... 201810144813.6

(51) Int. Cl.
*G06K 19/06* (2006.01)
*G06Q 20/32* (2012.01)
*G06F 21/36* (2013.01)

(52) U.S. Cl.
CPC ... *G06Q 20/3274* (2013.01); *G06K 19/06028* (2013.01); *G06K 19/06037* (2013.01); *G06K 19/06103* (2013.01); *G06F 21/36* (2013.01)

(58) Field of Classification Search
CPC ......... G06Q 20/3274; G06K 19/06103; G06K 19/06037; G06K 19/06028; G06F 21/36
See application file for complete search history.

(56) References Cited

U.S. PATENT DOCUMENTS 6,669,085 B1 12/2003 Bergen
6,766,956 B1 7/2004 Boylan, III et al.
(Continued)

FOREIGN PATENT DOCUMENTS

CN 103218137 A 7/2013
EP 2782060 A1 9/2014
(Continued)

OTHER PUBLICATIONS

Gao et al., "A 2D Barcode-Based Mobile Payment System; 320-329, Jun. 2009", http://www.researchgate.net/profile/Jerry_Gao/publication/221281905_A_2D_Barcode Ba scd_Mobile_Payment_System/links/54fffc590cf2caf210bcd49c.pdf, entire document.
(Continued)

*Primary Examiner* — Thien M Le
(74) *Attorney, Agent, or Firm* — Seed IP Law Group LLP

(57) ABSTRACT

Embodiments of the present application provide a method and an apparatus for displaying an identification code of an application. The method includes: acquiring an identification code in a target application in a system user interface (UI), where the identification code is generated by the target application according to user information in the target application; and displaying the identification code in an icon-display region of the target application in the system UI.

20 Claims, 12 Drawing Sheets

(56) References Cited

U.S. PATENT DOCUMENTS

| | | |
|---|---|---|
| 8,308,056 B2 | 11/2012 | Millan Marco |
| 8,670,976 B2 | 3/2014 | Al-Omari et al. |
| 8,725,490 B2 | 5/2014 | Athsani et al. |
| 8,731,513 B2 | 5/2014 | Lemberg et al. |
| 8,817,959 B1 | 8/2014 | O'Hanlon |
| 9,679,310 B1 | 6/2017 | Saltzstein et al. |
| 9,760,871 B1 | 9/2017 | Pourfallah et al. |
| 11,282,064 B2* | 3/2022 | Zhu .................. G07G 1/01 |
| 2002/0026475 A1 | 2/2002 | Marmor |
| 2002/0077805 A1 | 6/2002 | Hecht et al. |
| 2003/0115552 A1 | 6/2003 | Jahnke et al. |
| 2003/0186723 A1 | 10/2003 | Kim |
| 2004/0078282 A1 | 4/2004 | Robinson |
| 2004/0210841 A1 | 10/2004 | Takahashi |
| 2005/0138124 A1 | 6/2005 | Klassen et al. |
| 2006/0065733 A1 | 3/2006 | Lee et al. |
| 2006/0285748 A1 | 12/2006 | Tateno et al. |
| 2007/0016682 A1 | 1/2007 | Hodgson |
| 2007/0178918 A1 | 8/2007 | Shon |
| 2008/0097746 A1 | 4/2008 | Tagata et al. |
| 2009/0006342 A1 | 1/2009 | Wong et al. |
| 2009/0197582 A1* | 8/2009 | Lewis .................. H04L 67/55 455/414.2 |
| 2009/0199107 A1* | 8/2009 | Lewis .................. G06Q 30/0271 715/745 |
| 2010/0057586 A1 | 3/2010 | Chow |
| 2010/0100093 A1* | 4/2010 | Azure .................. A61B 18/1477 606/41 |
| 2010/0125509 A1* | 5/2010 | Kranzley .................. G06Q 40/00 705/17 |
| 2010/0159965 A1 | 6/2010 | Pascal et al. |
| 2010/0272193 A1 | 10/2010 | Khan et al. |
| 2011/0016476 A1* | 1/2011 | Raju .................. G06F 9/541 715/764 |
| 2011/0270751 A1 | 11/2011 | Csinger et al. |
| 2012/0042281 A1 | 2/2012 | Green |
| 2012/0118976 A1 | 5/2012 | Debski |
| 2012/0271619 A1 | 10/2012 | Abdel-Kader |
| 2012/0271725 A1 | 10/2012 | Cheng |
| 2013/0026241 A1 | 1/2013 | Sakahashi et al. |
| 2013/0124186 A1 | 5/2013 | Donabedian et al. |
| 2013/0144674 A1 | 6/2013 | Kim et al. |
| 2013/0191205 A1* | 7/2013 | Harkless .................. G06Q 30/0239 705/14.39 |
| 2013/0217377 A1 | 8/2013 | Yu |
| 2013/0253901 A1 | 9/2013 | Krack et al. |
| 2013/0271619 A1 | 10/2013 | Longmore et al. |
| 2013/0282360 A1 | 10/2013 | Shimota et al. |
| 2013/0288633 A1 | 10/2013 | Lemberg et al. |
| 2013/0311918 A1 | 11/2013 | McCoy et al. |
| 2013/0325435 A1 | 12/2013 | Hawkins et al. |
| 2014/0006198 A1 | 1/2014 | Daly et al. |
| 2014/0074605 A1* | 3/2014 | Sanchez .................. H04L 63/083 705/14.64 |
| 2014/0129428 A1* | 5/2014 | Tyler .................. G06Q 20/3276 705/39 |
| 2014/0172407 A1 | 6/2014 | Eden et al. |
| 2014/0195218 A1 | 7/2014 | Takaoka et al. |
| 2014/0257788 A1 | 9/2014 | Xiong et al. |
| 2014/0339296 A1 | 11/2014 | McAdams et al. |
| 2015/0005987 A1 | 1/2015 | Khorsheed et al. |
| 2015/0193553 A1 | 7/2015 | Petersen |
| 2015/0269565 A1 | 9/2015 | Inotay et al. |
| 2015/0358787 A1 | 12/2015 | Huang et al. |
| 2015/0370786 A1 | 12/2015 | Kwon |
| 2016/0042263 A1 | 2/2016 | Gaddam et al. |
| 2016/0078335 A1 | 3/2016 | Annamalai et al. |
| 2016/0203126 A1 | 7/2016 | Zhu |
| 2017/0076127 A1 | 3/2017 | Arce et al. |
| 2017/0192723 A1 | 7/2017 | Ichikawa et al. |
| 2018/0181672 A1 | 6/2018 | Wu et al. |
| 2019/0066089 A1 | 2/2019 | Miryala et al. |
| 2019/0108907 A1 | 4/2019 | Kadri et al. |
| 2019/0230152 A1 | 7/2019 | Wang et al. |
| 2019/0230165 A1 | 7/2019 | Wang et al. |
| 2019/0295056 A1 | 9/2019 | Wright |
| 2020/0218522 A1* | 7/2020 | Shah .................. G06F 8/61 |
| 2020/0269091 A1* | 8/2020 | Liu .................. G16H 20/30 |
| 2020/0334660 A1 | 10/2020 | Mossoba et al. |

FOREIGN PATENT DOCUMENTS

| | | |
|---|---|---|
| GB | 2283850 A | 5/1995 |
| JP | 2009098974 A | 5/2009 |
| KR | 20100053707 A | 5/2010 |
| WO | 2008064909 A2 | 6/2008 |
| WO | 2010135263 A2 | 11/2010 |
| WO | 2014001937 A1 | 1/2014 |

OTHER PUBLICATIONS

Rouillard. "Contextual QR Codes", 50-55, Jul. 2008, http://www.lifl.fr/-rouillar/publi/2008_Rouillard_ICCGI.pdf, entire document.

Anonymous, "EnvoyWorldWide Unveils Intelligent and Interactive Messaging Capabilities at DEMO 2001," Business Wire, Feb. 2001.

Carzaniga et al., "Designing Distributed Applciations With Mobile Code Paradigms", 22-32, May 1997, http://sei.pku.edu.cn/-yaoguo/PhDReading07/carzaniga-icse 19.pdf, entire document.

Johnston et al., "Electronic Data Interchange Using Two Dimensional Bar Code", 83-91, Jan. 1998, http://www.computer.org/csdl/proceedings/hicss/1998/8242/04/82420083.pdf.

Ibrahim et al., "Steganography Algorithm to Hide Secret Message Inside an Image", 102-108, Dec. 2011, http://arxiv.org/pdf/1112.2809.

* cited by examiner

S302

Display, in an icon-display region of a target application of a system UI, an identification code in the target application, where the identification code is generated by the target application according to user information in the target application

Display, in a specified region in a system UI, an identification code in a target application, where the identification code is generated by the target application according to user information in the target application

FIG. 8

METHOD AND APPARATUS FOR DISPLAYING IDENTIFICATION CODE OF APPLICATION

CROSS-REFERENCE TO RELATED APPLICATIONS

This application is a continuation of U.S. application Ser. No. 16/959,637, entitled "METHOD AND APPARATUS FOR DISPLAYING IDENTIFICATION CODE OF APPLICATION," by inventor Dengchao Zhu, filed 1 Jul. 2020, which is a national stage application filed 35 U.S.C. § 371 of PCT Application No. PCT/CN2019/073573, entitled "METHOD AND APPARATUS FOR DISPLAYING IDENTIFICATION CODE OF APPLICATION," by inventor Dengchao Zhu, filed 29 Jan. 2019, which claims priority to Chinese Patent Application No. 201810144813.6, filed on Feb. 12, 2018 and entitled "METHOD AND APPARATUS FOR DISPLAYING IDENTIFICATION CODE OF APPLICATION," the disclosures of which are incorporated herein by reference in their entirety.

BACKGROUND

Field

The present application relates to the field of terminal devices, and in particular, to a method and an apparatus for displaying an identification code of an application.

Related Art

With the rapid development of information technology, identification codes such as two-dimensional (2D) codes and bar codes have been widely applied in many fields, such as the payment field and the authentication field. However, in order to use an identification code, a user generally needs to unlock a screen of a terminal device, launch a corresponding application, find an identification code in the menu of the application, and then open and display the identification code.

The aforementioned method for displaying an identification code requires many steps, involves complex operations, and is time-consuming, making displaying the identification code inconvenient to users. To solve this problem, in current technologies, after the screen of a terminal device is unlocked, a specific operation can be performed to directly enter a menu page of the application, thus allowing the user to directly find the identification code in the menu, and open and display the identification code.

However, although the current technology for displaying the identification code reduces steps needed to activate the application, the operation process is still complex and time-consuming.

Therefore, there is an urgent need for a method to display an identification code of an application in order to simplify the operation process and reduce time required for displaying the identification code of the application.

SUMMARY

The objective of embodiments of the present application is to provide a method and an apparatus for displaying an identification code of an application. An identification code of a target application is displayed in an icon-display region of the target application in a system user interface (UI), such that when the identification code needs to be displayed, it is unnecessary to open the target application or to search for the identification code in the menu of the target application. Only an icon of the target application needs to be displayed. Thus, it is convenient for a user to display the identification code of the target application. The operation is simple, convenient, and less time-consuming.

To solve the aforementioned technical problem, the disclosed embodiments can be implemented as follows:

One embodiment can provide a method for displaying an identification code of an application, the method comprising:
 acquiring an identification code in a target application in a system user interface (UI), wherein the identification code is generated by the target application according to user information in the target application; and
 displaying the identification code in an icon-display region of the target application in the system UI.

One embodiment can provide a method for displaying an identification code of an application, comprising:
 acquiring an identification code in a target application in a system UI, wherein the identification code is generated by the target application according to user information in the target application; and
 displaying the identification code in a specified display region in the system UI.

One embodiment can further provide a method for displaying an identification code of an application, comprising:
 displaying, in an icon-display region of a target application in a system UI, an identification code in the target application, wherein
 the identification code is generated by the target application according to user information in the target application.

One embodiment can further provide a method for displaying an identification code of an application, the method comprising:
 displaying, in a specified region in a system UI, an identification code in a target application, wherein
 the identification code is generated by the target application according to user information in the target application.

One embodiment can further provide an apparatus for displaying an identification code of an application, comprising:
 a first acquisition module configured to acquire an identification code in a target application in a system UI, wherein the identification code is generated by the target application according to user information in the target application; and
 a first display module, configured to display the identification code in an icon-display region of the target application in the system UI.

One embodiment can provide an apparatus for displaying an identification code of an application, comprising:
 a second acquisition module configured to acquire an identification code in a target application in a system UI, wherein the identification code is generated by the target application according to user information in the target application;
 a second display module configured to display the identification code in a specified display region in the system UI.

One embodiment can further provide an apparatus for displaying an identification code of an application, comprising:

a third display module configured to display, in an icon-display region in a target application in a system UI, an identification code in the target application, wherein
the identification code is generated by the target application according to user information in the target application.

One embodiment can further provide an apparatus for displaying an identification code of an application, comprising:
a fourth display module configured to display, in a specified region in a system UI, an identification code in a target application, wherein
the identification code is generated by the target application according to user information in the target application.

One embodiment can further provide a device for displaying an identification code of an application, comprising:
a processor; and
a memory configured to store computer-executable instructions which when executed by the processor, cause the processor to:
acquire an identification code in a target application in a system UI, wherein the identification code is generated by the target application according to user information in the target application; and
display the identification code in an icon-display region of the target application in the system UI.

One embodiment can further provide a device for displaying an identification code of an application, comprising:
a processor; and
a memory configured to store computer-executable instructions which when executed by the processor cause the processor to:
acquire an identification code in a target application in a system UI, wherein the identification code is generated by the target application according to user information in the target application; and
display the identification code in a specified display region in the system UI.

One embodiment can further provide a device for displaying an identification code of an application, comprising:
a processor; and
a memory configured to store computer-executable instructions which when executed by the processor cause the processor to:
display, in an icon-display region of a target application in a system UI, an identification code in the target application, wherein
the identification code is generated by the target application according to user information in the target application.

One embodiment can further provide a device for displaying an identification code of an application, comprising:
a processor; and
a memory configured to store computer-executable instructions which when executed by the processor cause the processor to:
display, in a specified region in a system UI, an identification code in a target application, wherein
the identification code is generated by the target application according to user information in the target application.

One embodiment can further provide a storage medium configured to store computer-executable instructions, wherein when the executable instructions are executed, the following process is implemented:
acquiring an identification code in a target application in a system UI, wherein the identification code is generated by the target application according to user information in the target application; and
displaying the identification code in an icon-display region of the target application in the system UI.

One embodiment can further provide a storage medium configured to store computer-executable instructions, wherein when the executable instructions are executed, the following process is implemented:
acquiring an identification code in a target application in a system UI, wherein the identification code is generated by the target application according to user information in the target application; and
displaying the identification code in a specified display region in the system UI.

One embodiment can further provide a storage medium configured to store computer-executable instructions, wherein when the executable instructions are executed, the following process is implemented:
displaying, in an icon-display region of a target application in a system UI, an identification code in the target application,
wherein the identification code is generated by the target application according to user information in the target application.

One embodiment can further provide a storage medium configured to store computer-executable instructions, wherein when the executable instructions are executed, the following process is implemented:
displaying, in a specified region in a system UI, an identification code in a target application, wherein
the identification code is generated by the target application according to user information in the target application.

By means of the technical solutions provided by the disclosed embodiments, an identification code in a target application in a system UI is displayed in an icon-display region of the target application, such that when the identification code needs to be displayed, the user no longer need to open the target application or to search for the identification code in a menu of the target application. Only an icon of the target application needs to be displayed. Therefore, it is convenient for a user to display the identification code of the target application, and the required operation is simple, convenient, and less time-consuming.

BRIEF DESCRIPTION OF THE FIGURES

To describe the technical solutions of the disclosed embodiments more clearly, the following descriptions briefly introduces the accompanying drawings for describing the embodiments. It is apparent that the accompanying drawings described below are only a part of the disclosed embodiments, and those of ordinary skill in the art may be able to derive other drawings from these accompanying drawings without creative efforts.

FIG. 7 presents a flowchart of a third method for displaying an identification code of an application, according to one embodiment.

FIG. 8 presents a flowchart of a fourth method for displaying an identification code of an application, according to one embodiment.

DETAILED DESCRIPTION

To enable those skilled in the art to better understand the technical solutions in the present application, the technical solutions in the embodiments of the present application will be described clearly and completely below with reference to the drawings in the embodiments of the present application. It is apparent that the described embodiments are merely some, rather than all of the embodiments of the present application. On the basis of the embodiments in the present application, all other embodiments obtained by those of ordinary skill in the art without making creative efforts should fall within the protection scope of the present application.

One embodiment can provide a method for displaying an identification code of an application. The method can be applied to a terminal device, such as a mobile phone, a tablet computer, or a computing device. By means of the method provided by the disclosed embodiments, when an identification code needs to be displayed, it is unnecessary to open a target application or to search for the identification code in a menu of the target application. Only an icon of the target application needs to be displayed. Hence, it is convenient for a user to display the identification code of the target application, and the required operation is simple and less time-consuming.

Figure 1:
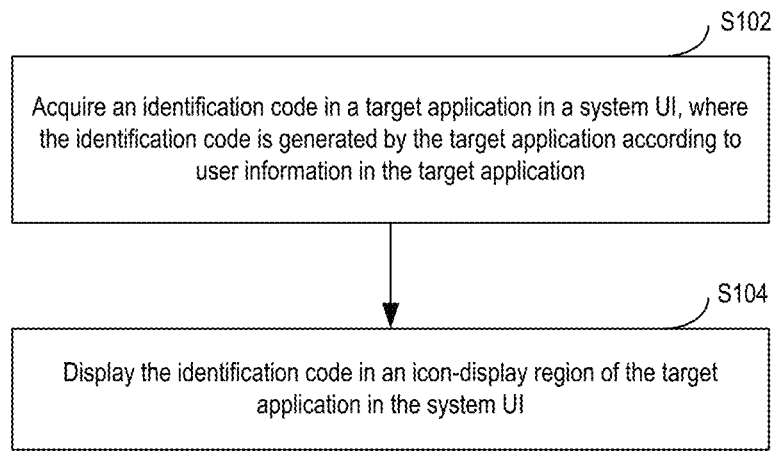
FIG. 1 presents a flowchart of a method for displaying an identification code of an application, according to one embodiment.
Figure 2A:
FIG. 2(a) presents a first schematic diagram of an identification code, according to one embodiment.
Figure 2B:
FIG. 2(b) presents a second schematic diagram of an identification code, according to one embodiment.
Figure 2C:
FIG. 2(c) presents a third schematic diagram of an identification code, according to one embodiment.
Figure 2D:
FIG. 2(d) presents a fourth schematic diagram of an identification code, according to one embodiment.
Figure 2E:
FIG. 2(e) presents a fifth schematic diagram of an identification code, according to one embodiment.
Figure 2F:
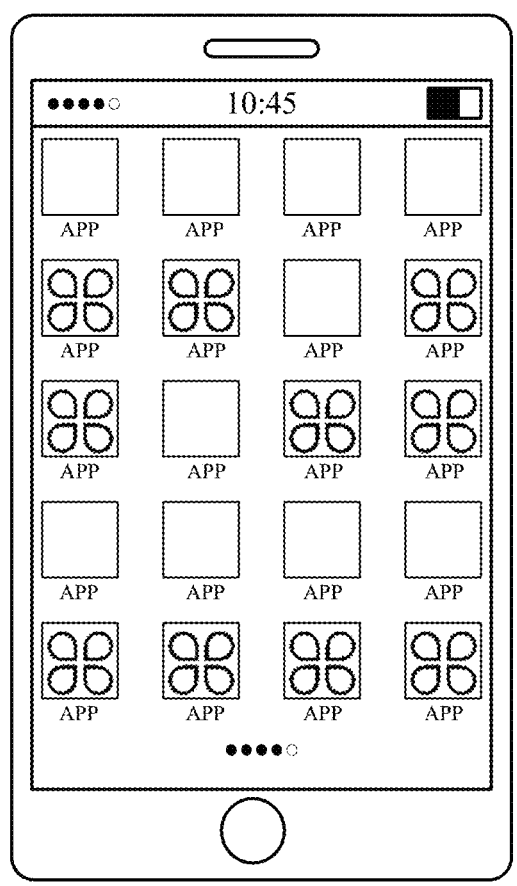
FIG. 2(f) presents a sixth schematic diagram of an identification code, according to one embodiment.

FIG. 1 presents a flowchart of a method for displaying an identification code of an application, according to one embodiment. The method shown in FIG. 1 includes at least the following operations:

Operation S102: acquire an identification code in a target application in a system user interface (UI), where the identification code is generated by the target application according to user information in the target application.

The target application refers to a target application in a system UI of a terminal device. The target application may be any application installed in the terminal device, such as a payment application, a user-authentication application, an access-control application, or a membership-card application.

The "user information in the target application" in this embodiment refers to user information left by a user in the target application when the user is using the target application in the terminal device, such as personal information or account information left by the user in the target application when the user logs in to the target application. Accordingly, the identification code generated by the target application according to the user information in the target application can be an identification code generated according to the user information of the user. For example, a target application B is installed on a mobile phone of a user A, and user A uses the mobile phone to open target application B and logs in, then the target application B on the mobile phone acquires corresponding user login information, such as personal information of user A. At this time, target application B may generate, according to the personal information of user A, a corresponding identification code, such as an identification code corresponding to the personal information of user A or a payment identification code for making payment by the user A.

The aforementioned target application carries the user information. In order to protect the user's privacy and to facilitate the use of the target application by the user, the target application generally generates an identification code according to the user information, such that the user can conveniently display the identification code to other users when using the mobile device.

The identification code can be an identification code pattern. The identification code can be a pure 2D code or bar code, or can be a combined pattern of a plurality of individual patterns. In one embodiment, the identification code can includes any one of the following:

a 2D code, a bar code, a pattern formed by at least a 2D code and a logo pattern of the target application, a pattern formed by at least a bar code and the logo pattern of the target application, and an arrangement trajectory of icons of a plurality of predetermined applications displayed in the system UI.

The logo pattern of the target application can be an icon of the target application or a name of the target application.

In one embodiment, the identification code being a pattern formed by at least a 2D code and the logo pattern of the target application can include: the identification code being a pattern formed by a 2D code and the logo pattern of the target application, or the identification code being a pattern formed by a 2D code, the logo pattern of the target application, and other content. Similarly, the identification code being a pattern formed by at least a bar code and the logo pattern of the target application can include: the identification code being a pattern formed by a bar code and the logo pattern of the target application, or the identification code being a pattern formed by a bar code, the logo pattern of the target application, and other content.

To facilitate the understanding of the identification code being a pattern formed by at least a 2D code and the logo pattern of the target application or a pattern formed by at least a bar code and the logo pattern of the target application, following examples are provided.

In one example, the target application can be Alipay™, and the logo pattern of the target application can include a Chinese character "支" Specifically, the identification code can be a pattern formed by a 2D code and the character "支" or the identification code can be a pattern formed by a bar code and the character "支." Within the identification code, the location of the character "支" and the 2D code or the bar code may be arbitrarily configured. FIG. 2(*a*), FIG. 2(*b*), FIG. 2(*c*), and FIG. 2(*d*) show several possible forms of the identification code.

In FIG. 2(*a*), the identification code can be formed by a bar code and the character "支;" the bar code occupies the lower half region of the entire identification code; the character "支" occupies the upper half region of the entire identification code. In FIG. 2(*b*), the identification code can be formed by a 2D code and the character "支;" the 2D code occupies the lower half region of the entire identification code; and the character "支" occupies the upper half region of the entire identification code. In FIG. 2(*c*), the identification code is formed by a 2D code and the character "支;" the 2D code is located in the bottom layer of the identification code and occupies the entire region of the identification code; and the character "it" floats on the top layer of the 2D code. In the identification code shown in FIG. 2(*d*), the identification code is formed by a 2D1 code and the character "支;" the identification code is located in the bottom layer of the identification code; the "支" is disposed in the lower-right corner region of the 2D code and partially overlaps the 2D code.

Certainly, the aforementioned FIG. 2(*a*), FIG. 2(*b*), FIG. 2(*c*), and FIG. 2(*d*) only show several possible forms of the identification code being a pattern formed by a 2D code (or a bar code) and the character "支" However, the pattern formed by a 2D code (or a bar code) and the character "支" is not limited to these examples, and may also be in other forms, which will not be enumerated in the present application.

For example, in another embodiment, to facilitate the user in identifying the target application, the identification code may be a pattern formed by a 2D code, the character "支" of Alipay, and the word "Alipay." A possible form is shown in FIG. 2(*e*).

In the identification code shown in FIG. 2(*e*), the character "支" is located in the middle region of the 2D code, and the word "Alipay" is located in the bottom region of the 2D code.

Furthermore, in one embodiment, the identification code can be an arrangement trajectory of icons of a plurality of predetermined applications located in the system UI.

For example, in one specific implementation, a plurality of applications located in the same UI of the system can be selected, and a trajectory pattern obtained by arranging and combining icons of the selected applications can be used as an identification code. As shown in FIG. 2(*f*), icons of selected applications may be arranged into a "Z" shape to serve as an identification code.

In one embodiment, acquiring an identification code in a target application in a system UI in the aforementioned operation S102 specifically includes:

acquiring the identification code in the target application at a predetermined time interval;

and/or acquiring the identification code in the target application when a user launches the target application.

In one embodiment, if the identification code remains unchanged after the identification code is displayed in an icon-display region of the target application, then the identification code may be leaked, leading to leakage of user information, causing security risks. Therefore, in order to ensure the security of user information, the identification code displayed in the icon-display region of the target application may be updated periodically.

In one embodiment, acquiring an identification code in a target application in a system UI in the aforementioned operation S102 includes at least the following three cases:

Case 1: acquiring the identification code in the target application at a predetermined time interval.

The predetermined time interval may be any value, such as 2 seconds, 10 seconds, 1 minute, or 10 minutes. The specific value of the predetermined time interval may be set according to the actual implementation. The specific value of the predetermined time interval is not limited in embodiments of the present application.

In one specific implementation, the identification code in the target application is updated at a certain time interval, for example, updated every few minutes. In one embodiment, a current identification code in the target application can be acquired from the target application at a predetermined time interval. Data corresponding to the identification code may be acquired.

In another implementation, the identification code in the target application may further be acquired directly from a server at a predetermined time interval. Certainly, data corresponding to the identification code may be acquired from the server.

In one embodiment, the identification code in the target application is acquired at a predetermined time interval, such that the identification code displayed in the icon-display region of the target application can be updated, thereby improving the security of user information.

Case 2: acquiring the identification code in the target application when a user launches the target application.

In this case, when the user launches the target application, update of the identification code displayed in the icon-display region of the target application is triggered. That is, when the user launches the target application, a current identification code of the target application is acquired from the target application.

Case 3: when the user launches the target application, acquisition of the identification code in the target application at a predetermined time interval by the terminal device is triggered.

In this case, when the user launches the target application, acquisition of the identification code in the target application at a predetermined time interval within a period of time may be triggered.

Operation S104: display the identification code in an icon-display region of the target application in the system UI.

After the identification code in the target application is acquired, the identification code is displayed in the icon-display region of the target application. This way, when the user needs to use the identification code for payment, authentication, or the like, the user can directly display an icon of the target application in the system UI to other users to facilitate the user's operation.

In the aforementioned operation S104, displaying the identification code in an icon-display region of the target application in the system UI in fact is using the identification code in place of the original icon of the target application.

Figure 3:
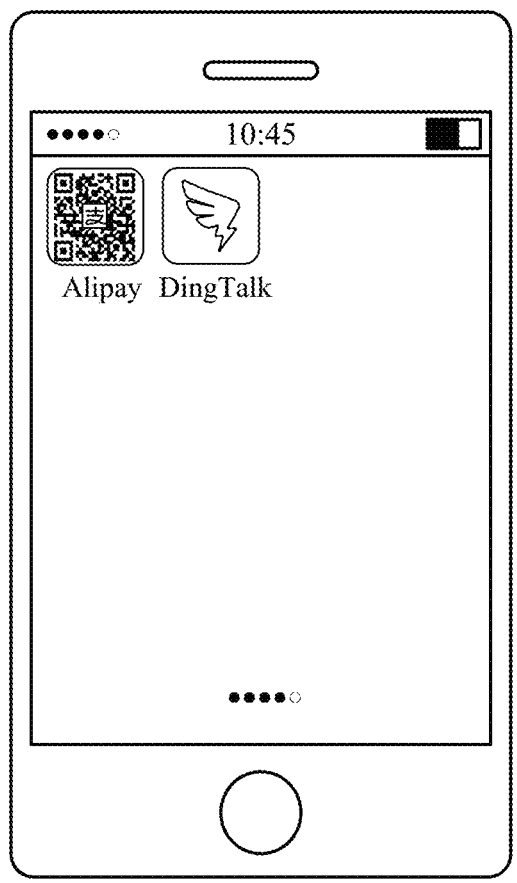
FIG. 3 presents a schematic diagram illustrating the effect of displaying an identification code in an icon-display region of a target application, according to one embodiment.

For example, the aforementioned target application is Alipay, and a schematic diagram illustrating the effect of displaying an identification code of Alipay in an icon-display region of Alipay is shown in FIG. 3

Furthermore, in some scenarios, for the target application, a same user may have a plurality of accounts, and different accounts can correspond to different user information. When the user logs in to another account of the target application in the same terminal device, if the icon-display region of the target application still displays an identification code corresponding to an original account, then the identification code displayed to other users is a wrong identification code. Thus, when user information in the target application changes, the identification code displayed in the icon-display region of the target application also needs to be updated accordingly. Therefore, the method for displaying an identification code of an application provided by an embodiment of the present application can further include:

when the user information in the target application changes, updating the identification code in the target application according to the changed user information, and displaying the updated identification code in the icon-display region of the target application in the system UI.

In one embodiment, changing of the user information can include: logging in to a different account in the target application, the user modifying information in the target application, or the like.

In one embodiment, when it is detected that the user information of the target application changes, the identification code in the target application is updated according to the changed information; moreover, after the identification code in the target application is updated, the identification code of the information in the target application is acquired, and the identification code currently displayed in the icon-display region of the target application is updated to the newly acquired identification code.

Furthermore, in one embodiment, because the identification code is displayed in the icon-display region of the target application, and the icon-display region of the target application has a small area, the displayed identification code appear to be small; moreover, in some cases, the identification code may further include other patterns, causing only part of it to be the effective identification code when in use. Thus, when the identification code is used, a scanning device may be unable to scan the identification code, resulting in an identification failure or identification error. Therefore, in order to improve the success rate and accuracy of identification, the method provided by embodiments of the present application further includes the following steps (1) and (2):

Step (1): receiving an operation performed by the user on the terminal device; and Step (2): performing an enlarging operation on a predetermined region in the identification code in response to the above operation.

The operation in step (1) may be any gesture operation such as a press operation, a long-press operation, or a zoom operation performed on a screen of the terminal device; or the operation can be a voice input operation or the like.

The predetermined region in step (2) may be the entire region of the identification code, or may be a partial region in the identification code, such as a 2D code or bar code region in the identification code.

In one specific implementation, when the user displays the identification code to another user, before the other user uses a scanning device to scan the identification code, the user can perform a gesture operation on the terminal device. After the terminal device receives the gesture operation performed by the user, the predetermined region of the identification code is enlarged, thus facilitating the scanning device in scanning the enlarged identification code, thereby improving the success rate and accuracy of identification.

Furthermore, in one embodiment, because the user can display the identification code without the need to launch the target application, in order to allow the user to conveniently learn the identification result of the identification code, the method for displaying an identification code of an application provided in some embodiments of the present application further includes:

receiving first prompt information pushed by a server, indicating that the identification code is successfully identified; and displaying the first prompt information in the system UI;

or receiving second prompt information pushed by the server, indicating that the identification code has expired; and displaying the second prompt information in the system UI.

In one embodiment, if the identification code is successfully identified, then the server pushes to the terminal device first prompt information indicating successful identification, and after the terminal device receives the first prompt information pushed by the server, it displays the first prompt information in the current system UI; if it is detected that the identification code has expired, then the server pushes to the terminal device second prompt information indicating that the identification code has expired, and after the terminal device receives the second prompt information pushed by the server, it displays the second prompt information in the current system UI.

Figure 4A:
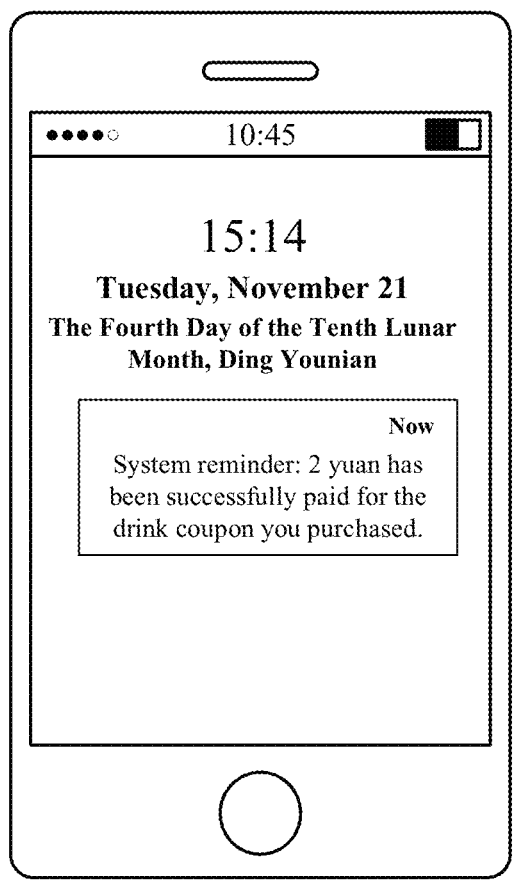
FIG. 4(a) presents a schematic diagram illustrating a first display interface of prompt information, according to one embodiment.
Figure 4B:
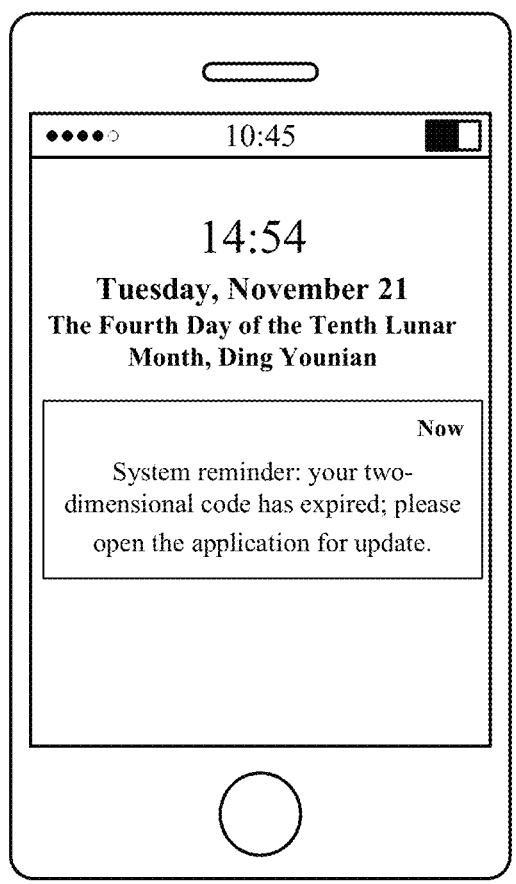
FIG. 4(b) presents a schematic diagram illustrating a second display interface of prompt information according to one embodiment.

In one specific implementation, if the aforementioned target application is Alipay and the aforementioned identification code is a 2D code, then a schematic diagram illustrating a display interface of the aforementioned first prompt information is shown in FIG. 4(a), and a schematic diagram illustrating a display interface of the aforementioned second prompt information is shown in FIG. 4(b).

In one embodiment, identification-related information of the identification code is pushed to the terminal device using a method of pushing a system message, thus facilitating the user in learning the current identification situation at any time, thereby enhancing interactions between the terminal device and the server and improving user experience.

The method for displaying an identification code of an application provided by one embodiment displays an identification code in a target application in a system UI in an icon-display region of the target application, such that when the identification code is needed for display, it is neither necessary to launch the target application nor to search for the identification code in a menu of the target application, only an icon of the target application needs to be displayed. Thus, it is convenient for a user to display the identification code of the target application, and such an operation is simple, convenient, and less time-consuming.

Figure 5:
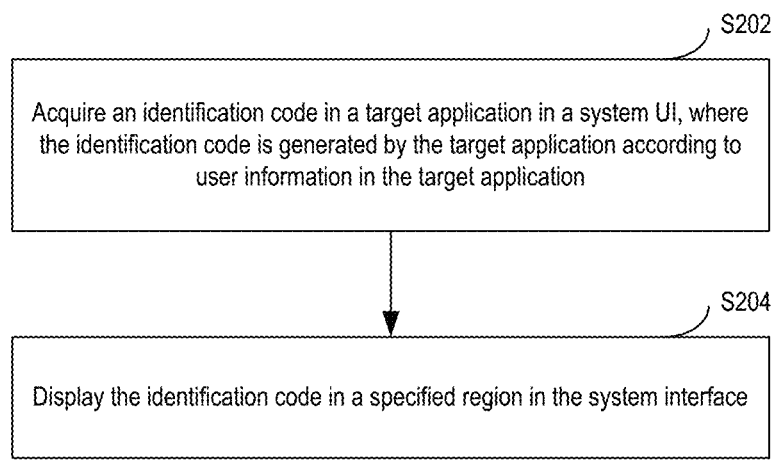
FIG. 5 presents a flowchart of a second method for displaying an identification code of an application, according to one embodiment.

Based on the method shown in FIGS. 1-4, one embodiment further provides a method for displaying an identification code of an application. FIG. 5 presents a flowchart of a second method for displaying an identification code of an application, according to one embodiment. The description herein focuses on differences between the method shown in FIG. 5 and the method shown in FIGS. 1-4. Reference may be made to the description of the method for displaying an identification code of an application provided in the aforementioned embodiment for similarities, which will not be described herein again. The method shown in FIG. 5 includes at least the following operations:

Operation S202: acquire an identification code in a target application in a system UI, the identification code being generated by the target application according to user information in the target application.

The target application can be referred to a target application in a system UI of a terminal device. The target application may be any application installed in the terminal device, for example, a payment application, a user-authentication application, an access-control application, or a membership card application.

The aforementioned target application carries the user information. In order to protect the user's privacy and facilitate the user in using the target application, the target application generally generates an identification code according to the user information, thus enabling the user to conveniently display the identification code to other users during use.

The identification code may be an identification code pattern. The identification code can be a pure 2D code or bar code, or can be a combined pattern of multiple patterns. Thus, in one embodiment, the identification code includes any one of the following:

a 2D code, a bar code, a pattern formed by at least a 2D code and a logo pattern of the target application, a pattern formed by at least a bar code and the logo pattern of the target application, and an arrangement trajectory of icons of a plurality of predetermined applications located in the system UI.

The logo pattern of the target application may be an icon of the target application or a name of the target application.

In one embodiment, the identification code being a pattern formed by at least a 2D code and the logo pattern of the target application includes: the identification code being formed by a 2D code and the logo pattern of the target application, or the identification code being formed by a 2D code, the logo pattern of the target application, and other content; similarly, the identification code being a pattern formed by at least a bar code and the logo pattern of the target application includes: the identification code being formed by a bar code and the logo pattern of the target application, or the identification code being formed by a bar code, the logo pattern of the target application, and other content.

Reference may be made to the descriptions of the aforementioned embodiment for the specific forms of the identification code, which will not be described herein again.

Specifically, in one embodiment, acquiring an identification code in a target application in a system UI in the aforementioned operation S202 specifically includes:

acquiring the identification code in the target application at a predetermined time interval;

and/or acquiring the identification code in the target application when a user launches the target application.

In one embodiment, if the identification code remains unchanged after the identification code is displayed in an icon-display region of the target application, then the identification code may be leaked, thus leading to leakage of user information, causing security risks. Therefore, in order to ensure the security of user information, the identification code displayed in the icon-display region of the target application may be updated periodically.

In one embodiment, acquiring an identification code in a target application in a system UI in the aforementioned operation S202 includes at least the following three cases:

Case 1: acquiring the identification code in the target application at a predetermined time interval.

The predetermined time interval may be any value, such as 2 seconds, 10 seconds, 1 minute, or 10 minutes. The specific value of the predetermined time interval may be set according to the actual implementation. The specific value of the predetermined time interval is not limited by embodiments of the present application.

In one specific implementation, the identification code in the target application is updated at a certain time interval, for example, updated every few minutes. In one embodiment, a current identification code of the target application may be acquired from the target application at a predetermined time interval. Data corresponding to the identification code may be acquired.

In another implementation, the identification code in the target application may further be acquired directly from a server at a predetermined time interval. Certainly, data corresponding to the identification code may be acquired from the server.

In one embodiment, the identification code in the target application is acquired at a predetermined time interval, such that the identification code displayed in the icon-display region of the target application can be updated, thereby improving the security of user information.

Case 2: acquiring the identification code in the target application when a user launches the target application.

In this case, when the user launches the target application, update to the identification code displayed in the icon-display region of the target application is triggered. That is, when the user launches the target application, a current identification code of the target application is acquired from the target application.

Case 3: triggering the terminal device's acquisition of the identification code in the target application at a predetermined time interval when the user launches the target application.

In this case, when the user launches the target application, acquisition of the identification code in the target application at a predetermined time interval within a period of time may be triggered.

Operation S204: display the identification code in a specified region in the system UI.

After the identification code in the target application is acquired, the identification code is displayed in the specified region in the system UI. In this manner, when the user needs to use the identification code for payment, authentication, or the like, the system UI can be directly displayed to other users to facilitate the user's operation.

Specifically, the displaying the identification code in a specified region in the system UI in the aforementioned operation S204 includes at least:

displaying the identification code in an icon-display region of the target application in the system UI;

or displaying the identification code on a wallpaper of the system UI.

Displaying the identification code in an icon-display region of the target application in the system UI actually means using the identification code to place of the original icon of the target application. Reference may be made to the description in the aforementioned embodiment for details of this case, which will not be described herein again.

Furthermore, displaying the identification code on a wallpaper of the system UI may be displaying the identification code in a certain region of the system UI or replacing the entire wallpaper with the identification code.

Figure 6A:
FIG. 6(a) presents a schematic diagram illustrating a first interface of displaying an identification code on a wallpaper of a system UI, according to one embodiment.
Figure 6B:
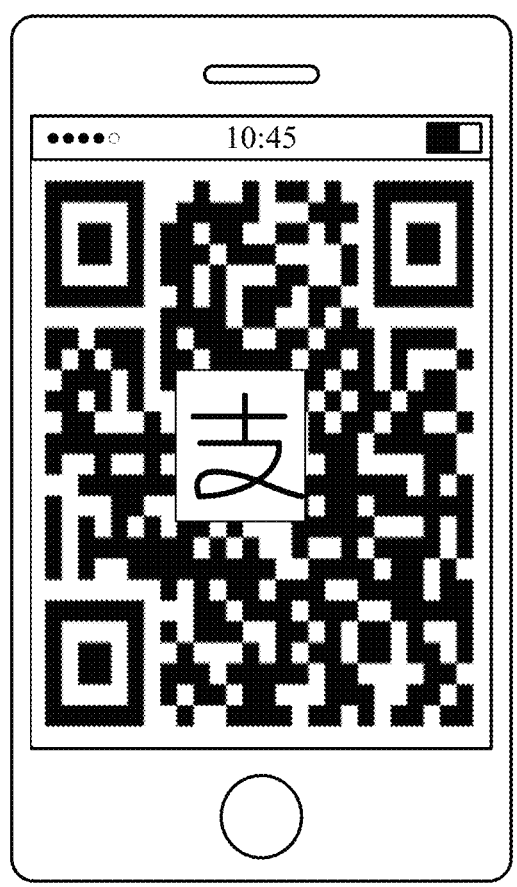
FIG. 6(b) presents a schematic diagram illustrating a second interface of displaying an identification code on a wallpaper of a system UI, according to one embodiment.

FIG. 6(a) presents a schematic diagram illustrating a first interface of displaying an identification code on a wallpaper of a system UI, according to one embodiment. In the case shown in FIG. 6(a), the identification code is displayed in the lower-right corner region of the wallpaper. FIG. 6(b) presents a schematic diagram illustrating a second interface of displaying an identification code on a wallpaper of a system UI, according to one embodiment. In the case shown in FIG. 6(b), the identification code is displayed over the entire region of the wallpaper. That is, the identification code is used as the wallpaper of the system UI.

Furthermore, in one embodiment, when the identification code is displayed in the specified region in the system UI, in order to prevent the occurrence of an identification failure or identification error due to a small identification code, after the identification code is displayed to other users, before the other user uses a scanning device to scan the identification code, the method provided by one embodiment may further include the following steps:

receiving an operation performed by the user on the terminal device; and performing an enlarging operation on a predetermined region in the identification code in response to the operation.

The operation in the aforementioned step may be any gesture operation, such as a press operation, a long-press operation, or a zoom operation performed on a screen of the terminal device; or the operation may further be a voice input operation or the like.

The predetermined region in the aforementioned step may be the entire region of the identification code, or may be a 2D code or bar code region in the identification code.

In one specific implementation, when the user displays the identification code to other users, before the other user uses a scanning device to scan the identification code, a gesture operation may be performed on the terminal device, and after the terminal device receives the gesture operation performed by the user, the predetermined region of the identification code is enlarged, thus facilitating the scanning device in scanning the enlarged identification code, thereby improving the success rate and accuracy of identification.

Furthermore, in one embodiment, because the user can display the identification code without the need to launch the target application, in order to allow the user to conveniently learn an identification result of the identification code, the method for displaying an identification code of an application provided by one embodiment further includes:

receiving first prompt information pushed by a server indicating that the identification code is successfully identified; and displaying the first prompt information in the system UI;

or receiving second prompt information pushed by the server indicating that the identification code has expired; and displaying the second prompt information in the system UI.

In one embodiment, if the identification code is successfully identified, then the server pushes to the terminal device first prompt information indicating successful identification, and after the terminal device receives the first prompt information pushed by the server, the first prompt information is displayed in the current system UI; if it is detected that the identification code has expired, then the server pushes to the terminal device second prompt information indicating that the identification code has expired, and after the terminal device receives the second prompt information pushed by the server, the second prompt information is displayed in the current system UI.

Furthermore, in some scenarios, for the target application, a same user may have multiple accounts, and different accounts correspond to different user information. If the user logs in to another account of the target application in the same terminal device, and the icon-display region of the target application still displays an identification code corresponding to an original account, then the identification code displayed to other users is a wrong identification code. Thus, when the user information in the target application changes, the identification code displayed in the icon-display region of the target application also needs to be updated accordingly. Therefore, the method for displaying an identification code of an application provided by one embodiment further includes:

when the user information in the target application changes, updating the identification code in the target application according to the changed user information, and displaying the updated identification code in the specified region in the system UI.

In one embodiment, changing in user information may include: logging in to a different account in the target application, the user modifying information in the target application, or the like.

In one embodiment, when it is detected that the user information of the target application changes, the identification code in the target application is updated according to the changed information; moreover, after the identification code in the target application is updated, the identification code of the user information in the target application is acquired, and the identification code currently displayed in the specified region in the system UI is updated to the newly acquired identification code.

The method for displaying an identification code of an application provided in one embodiment displays an identification code of a target application in a specified region in a system UI, such that when the identification code needs to be displayed, it is neither necessary to open the target application nor to search for the identification code in a menu of the target application, and only a page currently displayed by a terminal device needs to be switched to the system UI displaying the identification code. Thus, the operation is simple and convenient and less time-consuming.

Based on the method shown in FIG. 1 to FIG. 4, one embodiment further provides a method for displaying an identification code of an application. FIG. 7 presents a flowchart of a third method for displaying an identification code of an application, according to one embodiment. The description herein focuses on differences between the method shown in FIG. 7 and the method shown in FIGS. 1 to 4. Reference may be made to the description of the method for displaying an identification code of an application provided in the aforementioned embodiment for similarities, which will not be described herein again. The method shown in FIG. 7 includes at least the following operations:

Operation S302: display, in an icon-display region of a target application of a system UI, an identification code in the target application.

The identification code is generated by the target application according to user information in the target application.

The target application refers to a target application in a system UI of a terminal device. The target application may be any application installed in the terminal device, for example, a payment application, a user authentication application, an access-control application, or a membership card application.

The aforementioned target application carries the user information. In order to protect the user's privacy and facilitate the user in using the target application, the target application generally generates an identification code according to the user information, such that the user can conveniently display the identification code to other users during use.

The identification code may be an identification code pattern. The identification code may be a pure 2D code or bar code, or may be a combined pattern of a plurality of patterns. Thus, in one embodiment, the identification code includes any one of the following:

a 2D code, a bar code, a pattern formed by at least a 2D code and a logo pattern of the target application, a pattern formed by at least a bar code and the logo pattern of the target application, and an arrangement trajectory of icons of multiple predetermined applications located in the system UI.

The logo pattern of the target application may be an icon of the target application or a name of the target application.

In one embodiment, the identification code being a pattern formed by at least a 2D code and the logo pattern of the target application includes: the identification code being a pattern formed by a 2D code and the logo pattern of the target application, or the identification code being a pattern formed by a 2D code, the logo pattern of the target application, and other content; similarly, the identification code being a pattern formed by at least a bar code and the logo pattern of the target application includes: the identification code being a pattern formed by a bar code and the logo pattern of the target application, or the identification code being a pattern formed by a bar code, the logo pattern of the target application, and other content.

Displaying the identification code in an icon-display region of the target application in the system UI in the aforementioned operation S302 actually means using the identification code to replace the original icon of the target application.

Furthermore, before the aforementioned operation S302 is performed, the method provided in one embodiment further includes the following operation:

acquiring the identification code in the target application in the system UI.

Acquiring the identification code in the target application in the system UI specifically includes:

acquiring the identification code in the target application at a predetermined time interval; and/or acquiring the identification code in the target application when a user launches the target application.

In one embodiment, if the identification code remains unchanged after the identification code is displayed in an icon-display region of the target application, then the identification code may be leaked, thus leading to leakage of user information, causing security risks. Therefore, in order to ensure the security of user information, the identification code displayed in the icon-display region of the target application may be updated periodically.

Specifically, acquiring the identification code in the target application in the system UI includes at least the following three cases:

Case 1: acquiring the identification code in the target application at a predetermined time interval.

The predetermined time interval may be any value, such as 2 seconds, 10 seconds, 1 minute, or 10 minutes. The specific value of the predetermined time interval may be set according to the actual implementation. The specific value of the predetermined time interval is not limited by embodiments of the present application.

In one specific implementation, the identification code in the target application is updated at a certain time interval, for example, updated every few minutes. In one embodiment, a current identification code of the target application may be acquired from the target application at a predetermined time interval. Data corresponding to the identification code may be acquired.

In another implementation, the identification code in the target application may further be acquired directly from a server at a predetermined time interval. Certainly, data corresponding to the identification code may be acquired from the server.

In one embodiment, the identification code in the target application is acquired at a predetermined time interval, such that the identification code displayed in the icon-display region of the target application can be updated, thereby improving the security of user information.

Case 2: acquiring the identification code in the target application when a user launches the target application.

In this case, when the user launches the target application, update to the identification code displayed in the icon-display region of the target application is triggered. That is, when the user launches the target application, a current identification code of the target application is acquired from the target application.

Case 3: triggering acquisition of the identification code in the target application at a predetermined time interval by the terminal device when the user launches the target application.

In this case, when the user launches the target application, acquisition of the identification code in the target application at a predetermined time interval within a period of time may be triggered.

Furthermore, in one embodiment, because the identification code is displayed in the icon-display region of the target application and the icon-display region of the target application has a small area, causing the displayed identification code to be small; moreover, in some cases, the identification code further includes other patterns, causing only part of it to be the effective identification code during use. As a result, when the identification code is used, a scanning device may be unable to scan the identification code, resulting in an identification failure or identification error. Therefore, in order to improve the success rate and accuracy of identification, the method provided in one embodiment further includes the following steps:

receiving an operation performed by the user on the terminal device; and performing an enlarging operation on a predetermined region in the identification code in response to the user operation.

The operation in the aforementioned step may be any gesture operation, such as a press operation, a long-press operation, or a zoom operation performed on a screen of the terminal device; or the operation may further be a voice input operation or the like.

The predetermined region in the aforementioned step may be the entire region of the identification code, or may be a partial region in the identification code, for example, a region corresponding to a 2D code or a bar code.

In one specific implementation, when the user displays the identification code to other users, before the other user uses a scanning device to scan the identification code, the user can perform a gesture operation on the terminal device, and after the terminal device receives the gesture operation, the predetermined region of the identification code is enlarged, thus facilitating the scanning device in scanning the enlarged identification code, thereby improving the success rate and accuracy of identification.

Furthermore, in one embodiment, because the user can display the identification code without the need to launch the target application, in order to allow the user to conveniently learn an identification result of the identification code, the method for displaying an identification code of an application provided by one embodiment further includes:

receiving first prompt information pushed by a server indicating that the identification code is successfully identified; and displaying the first prompt information in the system UI;

or receiving second prompt information pushed by the server indicating that the identification code has expired; and displaying the second prompt information in the system UI.

In one embodiment, if the identification code is successfully identified, then the server pushes to the terminal device first prompt information indicating successful identification, and after the terminal device receives the first prompt information pushed by the server, it displays the first prompt information in the current system UI; if it is detected that the identification code has expired, then the server pushes to the terminal device second prompt information indicating that the identification code has expired, and after the terminal device receives the second prompt information pushed by the server, it displays the second prompt information in the current system UI.

Furthermore, in some scenarios, for the target application, a same user may have multiple accounts, and different accounts correspond to different user information. If the user logs in to another account of the target application in the same terminal device, and the icon-display region of the target application still displays an identification code corresponding to an original account, then the identification code displayed to other users is a wrong identification code. Thus, when the user information in the target application changes, the identification code displayed in the icon-display region of the target application also needs to be updated accordingly. Therefore, the method for displaying an identification code of an application provided by one embodiment further includes:

when the user information in the target application changes, updating the identification code in the target application according to the changed user information, and displaying the updated identification code in the icon-display region of the target application in the system UI.

In one embodiment, changing the user information may include: logging in to a different account in the target application, the user modifying information in the target application, or the like.

In one embodiment, when it is detected that the user information of the target application changes, the identification code in the target application is updated according to the changed information; moreover, after the identification code in the target application is updated, the identification code of the information in the target application is acquired, and the identification code currently displayed in the icon-display region of the target application is updated to the newly acquired identification code.

The method for displaying an identification code of an application provided by one embodiment displays an identification code in a target application in a system UI in an icon-display region of the target application, such that when the identification code needs to be displayed, it is neither necessary to open the target application nor to search for the identification code in a menu of the target application, and only an icon of the target application needs to be displayed. Thus, it is convenient for a user to display the identification code of the target application, and the operation is simple, convenient and less time-consuming.

Based on the method shown in FIG. 1 to FIG. 6, one embodiment further provides a method for displaying an identification code of an application. FIG. 8 presents a flowchart of a fourth method for displaying an identification code of an application, according to one embodiment. The description herein focuses on differences between the method shown in FIG. 8 and the method shown in FIGS. 1 to 6. Reference may be made to the description of the method for displaying an identification code of an application in the embodiment corresponding to FIGS. 1 to 6 for similarities, which will not be described herein again. The method shown in FIG. 8 includes at least the following operations:

Operation S402: display, in a specified region in a system UI, an identification code in a target application.

The identification code is generated by the target application according to user information in the target application.

The target application refers to a target application in a system UI of a terminal device. The target application can be any application installed in the terminal device, for example, a payment application, a user authentication application, an access-control application, or a membership card application.

The aforementioned target application carries user information. In order to protect the user's privacy and facilitate the user in using the target application, the target application generally generates an identification code according to the user information, such that the user can conveniently display the identification code to other users during use.

The identification code may be an identification code pattern. The identification code may be a pure 2D code or bar code, or may be a combined pattern of multiple patterns. Thus, in one embodiment, the identification code includes any one of the following:

a 2D code, a bar code, a pattern formed by at least a 2D code and a logo pattern of the target application, a pattern formed by at least a bar code and the logo pattern of the target application, and an arrangement trajectory of icons of multiple predetermined applications located in the system UI.

The logo pattern of the target application may be an icon of the target application or a name of the target application.

In one embodiment, the identification code being a pattern formed by at least a 2D code and the logo pattern of the target application includes: the identification code being a pattern formed by a 2D code and the logo pattern of the target application, or the identification code being a pattern formed by a 2D code, the logo pattern of the target application, and other content; similarly, the identification code being a pattern formed by at least a bar code and the logo pattern of the target application includes: the identification code being a pattern formed by a bar code and the logo pattern of the target application, or the identification code being a pattern formed by a bar code, the logo pattern of the target application, and other content.

Reference may be made to the description in aforementioned embodiments for specific forms of the identification code, which will not be described herein again.

Furthermore, in one embodiment, displaying, in a specified region in a system UI, an identification code in a target application in the aforementioned operation S402 includes at least the following:
displaying the identification code in an icon-display region of the target application in the system UI;
or displaying the identification code on a wallpaper of the system UI.

Displaying the identification code in an icon-display region of the target application in the system UI actually means using the identification code to replace the original icon of the target application. Reference may be made to the description in the aforementioned embodiments for details in this case, which will not be described herein again.

Furthermore, displaying the identification code on a wallpaper of the system UI may be displaying the identification code in a certain region of the system UI or replacing the entire wallpaper with the identification code.

Furthermore, prior to the above operation S402 is performed, the method provided by one embodiment further includes the following operation:
acquiring the identification code in the target application in the system UI.

Specifically, in one embodiment, acquiring an identification code in a target application in a system UI in the aforementioned operation S202 specifically includes:
acquiring the identification code in the target application at a predetermined time interval;
and/or acquiring the identification code in the target application when a user launches the target application.

In one embodiment, if the identification code remains unchanged after the identification code is displayed in an icon-display region of the target application, then the identification code may be leaked, thus leading to user information leakage, causing security risks. Therefore, in order to ensure the security of user information, the identification code displayed in the icon-display region of the target application may be updated periodically.

In one embodiment, the acquiring an identification code in a target application in a system UI includes at least the following three cases:

Case 1: acquiring the identification code in the target application at a predetermined time interval.

The predetermined time interval may be any value, such as 2 seconds, 10 seconds, 1 minute, or 10 minutes. The specific value of the predetermined time interval may be set according to the actual implementation. The specific value of the predetermined time interval is not limited by embodiments of the present application.

In one specific implementation, the identification code in the target application is updated at a certain time interval, for example, updated every few minutes. In one embodiment, a current identification code of the target application may be acquired from the target application at a predetermined time interval. Data corresponding to the identification code may be acquired.

In another implementation, the identification code in the target application may further be acquired directly from a server at a predetermined time interval. Certainly, data corresponding to the identification code may be acquired from the server.

In one embodiment, the identification code in the target application is acquired at a predetermined time interval, such that the identification code displayed in the icon-display region of the target application can be updated, thereby improving the security of user information.

Case 2: acquiring the identification code in the target application when a user launches the target application.

In this case, when the user launches the target application, update to the identification code displayed in the icon-display region of the target application is triggered. That is, when the user launches the target application, a current identification code of the target application is acquired from the target application.

Case 3: triggering acquisition of the identification code in the target application at a predetermined time interval by the terminal device when the user launches the target application.

In this case, when the user launches the target application, acquisition of the identification code in the target application at a predetermined time interval within a period of time may be triggered.

Furthermore, in one embodiment, when the identification code is displayed in the specified region in the system UI, in order to prevent the occurrence of an identification failure or identification error caused by a small identification code, after the identification code is displayed to another user and before the other user uses a scanning device to scan the identification code, the method provided in one embodiment may further include the following steps:
receiving an operation performed by the user on the terminal device; and performing an enlarging operation on a predetermined region in the identification code in response to the operation.

The operation in the above step may be any gesture operation, such as a press operation, a long-press operation, or a zoom operation performed on a screen of the terminal device; or the operation may further be a voice input operation or the like.

The predetermined region in the aforementioned step may be an entire region of the identification code, or may be a 2D code or bar code region in the identification code.

In one specific implementation, when the user displays the identification code to another user, before the other user uses a scanning device to scan the identification code, the user can perform a gesture operation on the terminal device, and after the terminal device receives the gesture operation, the predetermined region of the identification code is enlarged, thus facilitating the scanning device in scanning the enlarged identification code, thereby improving the success rate and accuracy of identification.

Furthermore, in one embodiment, because the user can display the identification code without the need to launch the target application, in order to allow the user to conveniently learn an identification result of the identification code, the method for displaying an identification code of an application provided by one embodiment further includes:

receiving first prompt information pushed by a server indicating that the identification code is successfully identified; and displaying the first prompt information in the system UI;
or
receiving second prompt information pushed by the server indicating that the identification code has expired; and displaying the second prompt information in the system UI.

In one embodiment, if the identification code is successfully identified, then the server pushes to the terminal device first prompt information indicating successful identification, and after the terminal device receives the first prompt information pushed by the server, the first prompt information is displayed in the current system UI; if it is detected that the identification code has expired, then the server pushes to the terminal device second prompt information indicating that the identification code has expired, and after the terminal device receives the second prompt information pushed by the server, the second prompt information is displayed in the current system UI.

Furthermore, in some scenarios, for the target application, a same user may have multiple accounts, and different accounts correspond to different user information. If the user logs in to another account of the target application in the same terminal device, and the icon-display region of the target application still displays an identification code corresponding to an original account, then the identification code displayed to other users is a wrong identification code. Thus, when user information in the target application changes, the identification code displayed in the icon-display region of the target application also needs to be updated accordingly. Therefore, the method for displaying an identification code of an application provided in one embodiment further includes:

when the user information in the target application changes, updating the identification code in the target application according to the changed user information, and displaying the updated identification code in the specified region in the system UI.

In one embodiment, changing the user information may include: logging in to a different account in the target application, the user modifying information in the target application, or the like.

In one embodiment, when it is detected that the user information of the target application changes, the identification code in the target application is updated according to the changed information; moreover, after the identification code in the target application is updated, the identification code of the information in the target application is acquired, and the identification code currently displayed in the specified region in the system UI is updated to the newly acquired identification code.

To facilitate understanding of the method for displaying an identification code of an application provided by embodiments of the present application, the method for displaying an identification code of an application provided in one embodiment will be introduced in detail below using a specific scenario as an example, in which the target application is Alipay and Alipay is used for making payment.

Figure 9:
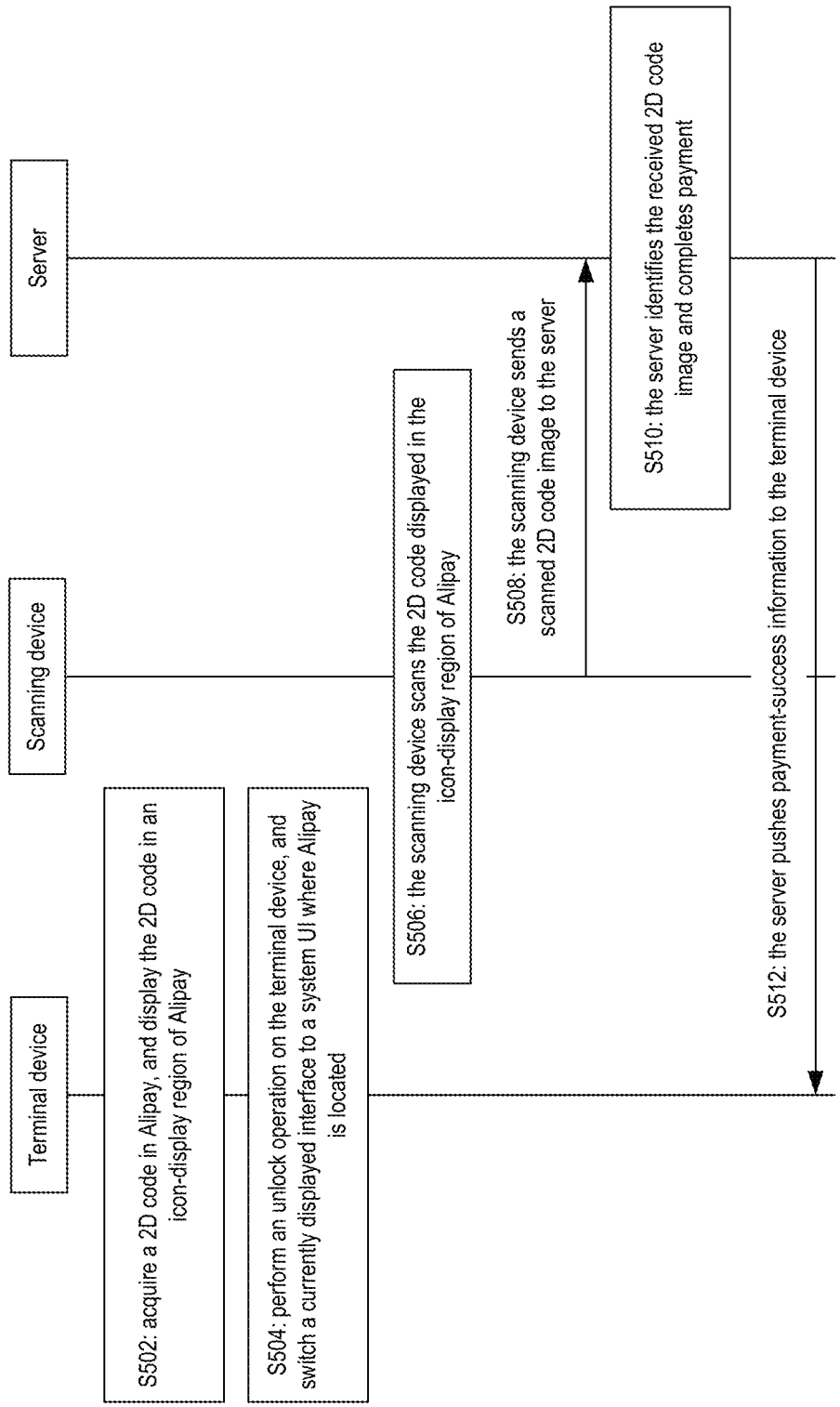
FIG. 9 presents a flowchart of a fifth method for displaying an identification code of an application, according to one embodiment.

FIG. 9 presents a flowchart of a fifth method for displaying an identification code of an application, according to one embodiment. The method shown in FIG. 9 includes at least the following operations:

Operation S502: acquire a 2D code in Alipay, and display the 2D code in an icon-display region of Alipay.

Acquiring a 2D code in Alipay may be acquiring the 2D code in Alipay at a predetermined time interval.

Operation S504: perform an unlock operation on a terminal device, and switch a currently displayed interface to a system UI where Alipay is located.

Operation S506: a scanning device scans the 2D code displayed in the icon-display region of Alipay.

Operation S508: the scanning device sends a scanned 2D code image to a server.

Operation S510: the server identifies the received 2D code image and completes the payment.

Operation S512: the server pushes payment-success information to the terminal device.

The method for displaying an identification code of an application provided by one embodiment displays an identification code of a target application in a specified region in a system UI, such that when the identification code needs to be displayed, it is neither necessary to launch the target application nor to search for the identification code in a menu of the target application, and only a page currently displayed by a terminal device needs to be switched to the system UI displaying the identification code. Thus, the operation is simple, convenient, and less time-consuming.

Figure 10:
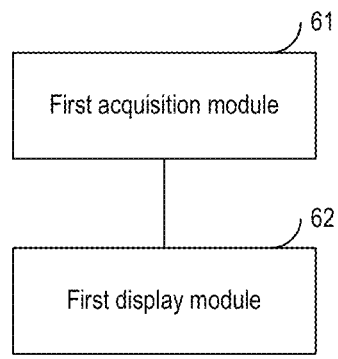
FIG. 10 presents a schematic diagram illustrating a first modular composition of an apparatus for displaying an identification code of an application, according to one embodiment.

Corresponding to the aforementioned method for displaying an identification code of an application, based on the same idea, one embodiment of the present application further provides an apparatus for displaying an identification code of an application. FIG. 10 presents a schematic diagram illustrating a first modular composition of an apparatus for displaying an identification code of an application, according to one embodiment. The apparatus shown in FIG. 10 includes:

a first acquisition module 61, configured to acquire an identification code in a target application in a system UI, where the identification code is generated by the target application according to user information in the target application; and
a first display module 62, configured to display the identification code in an icon-display region of the target application in the system UI.

Optionally, the apparatus provided in one embodiment further includes:
a first update module, configured to, when the user information in the target application changes, update the identification code in the target application according to the changed user information, where
the first display module displays the updated identification code in the icon-display region of the target application in the system UI.

Optionally, the first acquisition module includes:
a first acquisition unit, configured to acquire the identification code in the target application at a predetermined time interval;
and/or a second acquisition unit, configured to acquire the identification code in the target application when a user launches the target application.

Optionally, the apparatus provided in one embodiment further includes:
a first receiving module, configured to receive an operation performed by the user on a terminal device; and
a first enlarging module, configured to perform an enlarging operation on a predetermined region in the identification code in response to the operation.

Optionally, the identification code includes any one of the following:
a 2D code, a bar code, a pattern formed by at least a 2D code and a logo pattern of the target application, a pattern formed by at least a bar code and the logo pattern of the target application, and an arrangement trajectory of icons of a plurality of predetermined applications located in the system UI.

Optionally, the apparatus provided in one embodiment further includes:

a second receiving module, configured to receive first prompt information pushed by a server indicating that the identification code is successfully identified; and display the first prompt information in the system UI; or a third receiving module, configured to receive second prompt information pushed by the server indicating that the identification code has expired; and display the second prompt information in the system UI.

The apparatus for displaying an identification code of an application provided in one embodiment displays an identification code in a target application in a system UI in an icon-display region of the target application, such that when the identification code needs to be displayed, it is neither necessary to launch the target application nor to search for the identification code in the menu of the target application, and only an icon of the target application needs to be displayed. Thus, it is convenient for a user to display the identification code of the target application, and the operation is simple, convenient, and less time-consuming.

Figure 11:
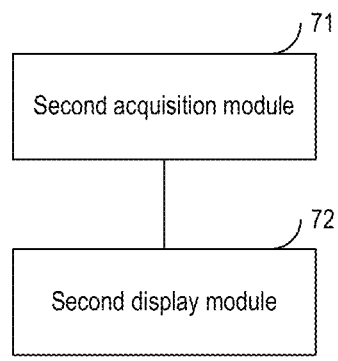
FIG. 11 presents a schematic diagram illustrating a second modular composition of an apparatus for displaying an identification code of an application, according to one embodiment.

Corresponding to the aforementioned method for displaying an identification code of an application, based on the same idea, one embodiment further provides an apparatus for displaying an identification code of an application. FIG. 11 presents a schematic diagram illustrating a second modular composition of an apparatus for displaying an identification code of an application, according to one embodiment. The apparatus shown in FIG. 11 includes:

a second acquisition module 71, configured to acquire an identification code in a target application in a system UI, where the identification code is generated by the target application according to user information in the target application; and a second display module 72, configured to display the identification code in a specified display region in the system UI.

Optionally, the second display module 72 includes:

a first display unit, configured to display the identification code in an icon-display region of the target application in the system UI;

or a second display unit, configured to display the identification code on a wallpaper of the system UI.

Optionally, the identification code includes any one of the following:

a 2D code, a bar code, a pattern formed by at least a 2D code and a logo pattern of the target application, a pattern formed by at least a bar code and the logo pattern of the target application, and an arrangement trajectory of icons of multiple predetermined applications located in the system UI.

Optionally, the apparatus for displaying an identification code of an application provided in one embodiment further includes:

a fourth receiving module, configured to receive an operation performed by the user on the terminal device; and a second enlarging module, configured to perform an enlarging operation on a predetermined region in the identification code in response to the operation.

The apparatus for displaying an identification code of an application provided in one embodiment displays an identification code of a target application in a specified region in a system UI, such that when the identification code needs to be displayed, it is neither necessary to launch the target application nor to search for the identification code in a menu bar of the target application, and only a page currently displayed by a terminal device needs to be switched to the system UI displaying the identification code. Thus, the operation is simple, convenient, and less time-consuming.

Figure 12:
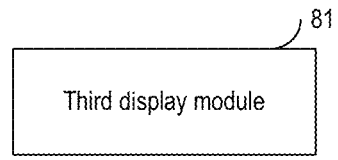
FIG. 12 presents a schematic diagram illustrating a third modular composition of an apparatus for displaying an identification code of an application, according to one embodiment.

Corresponding to the aforementioned method for displaying an identification code of an application, based on the same idea, one embodiment of the present application further provides an apparatus for displaying an identification code of an application. FIG. 12 presents a schematic diagram illustrating a third modular composition of an apparatus for displaying an identification code of an application, according to one embodiment. The apparatus shown in FIG. 12 includes:

a third display module 81, configured to display, in an icon-display region of a target application in a system UI, an identification code in the target application.

The identification code is generated by the target application according to user information in the target application.

Optionally, the apparatus for displaying an identification code of an application provided in one embodiment further includes:

a third acquisition module, configured to acquire the identification code in the target application in the system UI.

The apparatus for displaying an identification code of an application provided in one embodiment displays an identification code in a target application in a system UI in an icon-display region of the target application, such that when the identification code needs to be displayed, it is neither necessary to launch the target application nor to search for the identification code in the menu of the target application, and only an icon of the target application needs to be displayed. Thus, it is convenient for a user to display the identification code of the target application, and the operation is simple, convenient, and less time-consuming.

Figure 13:
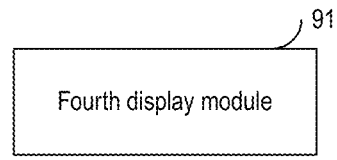
FIG. 13 presents a schematic diagram illustrating a fourth modular composition of an apparatus for displaying an identification code of an application, according to one embodiment.

Corresponding to the aforementioned method for displaying an identification code of an application, based on the same idea, one embodiment of the present application further provides an apparatus for displaying an identification code of an application. FIG. 13 presents a schematic diagram illustrating a fourth modular composition of an apparatus for displaying an identification code of an application, according to one embodiment. The apparatus shown in FIG. 13 includes:

a fourth display module 91, configured to display, in a specified region in a system UI, an identification code in a target application.

The identification code is generated by the target application according to user information in the target application.

Optionally, the apparatus provided in one embodiment further includes:

a fourth acquisition module, configured to acquire the identification code in the target application in the system UI.

Optionally, the fourth display module 91 includes:

a third display unit, configured to display the identification code in an icon-display region of the target application in the system UI;

or a fourth display unit, configured to display the identification code on a wallpaper of the system UI.

The apparatus for displaying an identification code of an application provided in one embodiment displays an identification code of a target application in a specified region in a system UI, such that when the identification code needs to be displayed, it is neither necessary to launch the target application nor to search for the identification code in the menu of the target application, and only a page currently displayed by a terminal device needs to be switched to the system UI displaying the identification code. Thus, the operation is simple, convenient, and less time-consuming.

Figure 14:
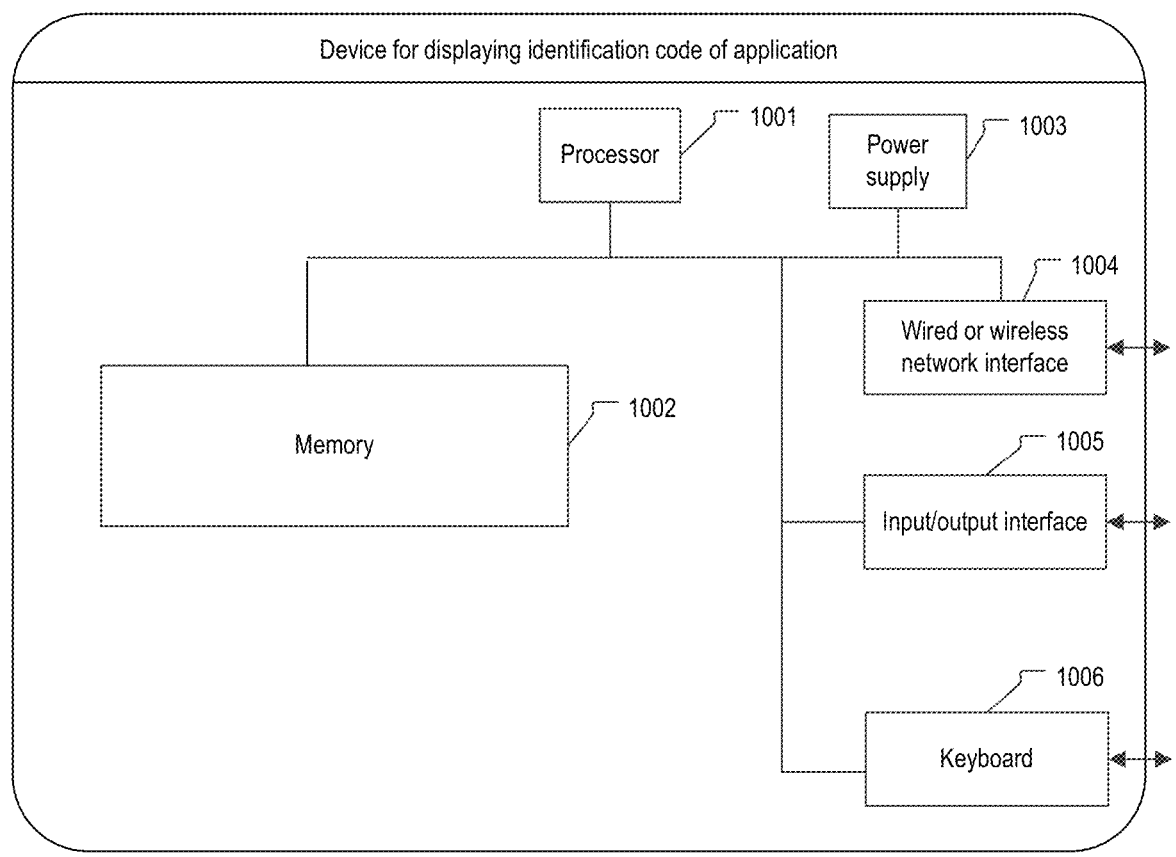
FIG. 14 presents a schematic structural diagram of a device for displaying an identification code of an application, according to one embodiment.

Further, based on the aforementioned methods shown in FIGS. 1 to 9, one embodiment of the present application further provides a device for displaying an identification code of an application, as shown in FIG. 14.

The device for displaying an identification code of an application may vary greatly due to different configurations or performance, and may include one or more processor 1001 and memory 1002. Memory 1002 may store one or more application or data. Memory 1002 may be used for transient storage or persistent storage. The application stored in memory 1002 may include one or more modules (not shown), and each module may include a series of computer-executable instructions in the device for displaying an identification code of an application. Furthermore, processor 1001 may be configured to communicate with memory 1002 and execute a series of computer-executable instructions in memory 1002 on the device for displaying an identification code of an application. The device for displaying an identification code of an application may further include one or more power supply 1003, one or more wired or wireless network interface 1004, one or more input/output interface 1005, one or more keyboard 1006, and so on.

In one specific embodiment, the device for displaying an identification code of an application includes a memory and one or more programs. The one or more programs are stored in the memory. The one or more programs may include one or more modules. Each module may include a series of computer-executable instructions in the device for displaying an identification code of an application. Through configuration, one or more processors execute the one or more programs including computer-executable instructions configured to perform the following operations:

acquiring an identification code in a target application in a system UI, where the identification code is generated by the target application according to user information in the target application; and displaying the identification code in an icon-display region of the target application in the system UI.

Optionally, when the computer-executable instructions are executed, the aforementioned method further includes:

when the user information in the target application changes, updating the identification code in the target application according to the changed user information, and displaying the updated identification code in the icon-display region of the target application in the system UI.

Optionally, when the computer-executable instructions are executed, acquiring an identification code in a target application in a system UI includes:

acquiring the identification code in the target application at a predetermined time interval;

and/or acquiring the identification code in the target application when a user launches the target application.

Optionally, when the computer-executable instructions are executed, the aforementioned method further includes:

receiving an operation performed by the user on the terminal device; and performing an enlarging operation on a predetermined region in the identification code in response to the operation.

Optionally, when the computer-executable instructions are executed, the identification code includes any one of the following:

a 2D code, a bar code, a pattern formed by at least a 2D code and a logo pattern of the target application, a pattern formed by at least a bar code and the logo pattern of the target application, and an arrangement trajectory of icons of multiple predetermined applications located in the system UI.

Optionally, when the computer-executable instructions are executed, the aforementioned method further includes:

receiving first prompt information pushed by a server indicating that the identification code is successfully identified; and displaying the first prompt information in the system UI;

or receiving second prompt information pushed by the server indicating that the identification code has expired; and displaying the second prompt information in the system UI.

The device for displaying an identification code of an application provided in one embodiment displays an identification code in a target application in a system UI in an icon-display region of the target application, such that when the identification code needs to be displayed, it is neither necessary to launch the target application nor to search for the identification code in the menu of the target application, and only an icon of the target application needs to be displayed. Thus, it is convenient for a user to display the identification code of the target application, and the operation is simple, convenient, and less time-consuming.

In one specific embodiment, the device for displaying an identification code of an application includes a memory and one or more programs. The one or more programs are stored in the memory. The one or more programs may include one or more modules. Each module may include a series of computer-executable instructions in the device for displaying an identification code of an application. Through configuration, one or more processors execute the one or more programs including computer-executable instructions configured to perform the following operations:

acquiring an identification code in a target application in a system UI, where the identification code is generated by the target application according to user information in the target application; and displaying the identification code in a specified display region in the system UI.

Optionally, when the computer-executable instructions are executed, displaying the identification code in a specified display region in the system UI includes:

displaying the identification code in an icon-display region of the target application in the system UI;

or displaying the identification code on a wallpaper of the system UI.

Optionally, when the computer-executable instructions are executed, the identification code includes any one of the following:

a 2D code, a bar code, a pattern formed by at least a 2D code and a logo pattern of the target application, a pattern formed by at least a bar code and the logo pattern of the target application, and an arrangement trajectory of icons of multiple predetermined applications located in the system UI.

Optionally, when the computer-executable instructions are executed, the aforementioned method further includes:

receiving an operation performed by the user on the terminal device; and performing an enlarging operation on a predetermined region in the identification code in response to the operation.

The device for displaying an identification code of an application provided in one embodiment displays an identification code of a target application in a specified region in a system UI, such that when the identification code needs to be displayed, it is neither necessary to launch the target application nor to search for the identification code in a menu bar of the target application, and only a page currently displayed by a terminal device needs to be switched to the system UI displaying the identification code. Thus, the operation is simple, convenient, and less time-consuming.

In one specific embodiment, the device for displaying an identification code of an application includes a memory and one or more programs. The one or more programs are stored in the memory. The one or more programs may include one or more modules. Each module may include a series of computer-executable instructions in the device for displaying an identification code of an application. Through configuration, one or more processors executes the one or more programs including computer-executable instructions configured to perform the following operations:

displaying, in an icon-display region of a target application in a system UI, an identification code in the target application.

The identification code is generated by the target application according to user information in the target application.

Optionally, when the computer-executable instructions are executed, before displaying, in an icon-display region of a target application in a system UI, an identification code in the target application, the method further includes:

acquiring the identification code in the target application in the system UI.

The device for displaying an identification code of an application provided in one embodiment displays an identification code in a target application in a system UI in an icon-display region of the target application, such that when the identification code needs to be displayed, it is neither necessary to launch the target application nor to search for the identification code in the menu of the target application, and only an icon of the target application needs to be displayed. Thus, it is convenient for a user to display the identification code of the target application, and the operation is simple, convenient, and less time-consuming.

In one specific embodiment, the device for displaying an identification code of an application includes a memory and one or more programs. The one or more programs are stored in the memory. The one or more programs may include one or more modules. Each module may include a series of computer-executable instructions in the device for displaying an identification code of an application. Through configuration, one or more processors execute the one or more programs including computer-executable instructions configured to perform the following operations:

displaying, in a specified region in a system UI, an identification code in a target application.

The identification code is generated by the target application according to user information in the target application.

Optionally, when the computer-executable instructions are executed, before displaying, in a specified region in a system UI, an identification code in a target application, the method further includes:

acquiring the identification code in the target application in the system UI.

Optionally, when the computer-executable instructions are executed, displaying, in a specified region in a system UI, an identification code in a target application includes:

displaying the identification code in an icon-display region of the target application in the system UI;

or displaying the identification code on a wallpaper of the system UI.

The device for displaying an identification code of an application provided in one embodiment displays an identification code of a target application in a specified region in a system UI, such that when the identification code needs to be displayed, it is neither necessary to launch the target application nor to search for the identification code in the menu of the target application, and only a page currently displayed by a terminal device needs to be switched to the system UI displaying the identification code. Thus, the operation is simple, convenient, and less time-consuming.

Further, based on the methods shown in FIGS. 1 to 9, one embodiment of the present application further provides a storage medium, for storing computer-executable instructions. In one specific embodiment, the storage medium may be a USB flash disk, an optical disk, a hard disk, or the like. When the computer-executable instructions stored in the storage medium are executed by a processor, the following process can be implemented:

acquiring an identification code in a target application in a system UI, where the identification code is generated by the target application according to user information in the target application; and displaying the identification code in an icon-display region of the target application in the system UI.

Optionally, when the computer-executable instructions stored in the storage medium are executed by the processor, the aforementioned method further includes:

when the user information in the target application changes, updating the identification code in the target application according to the changed user information, and displaying the updated identification code in the icon-display region of the target application in the system UI.

Optionally, when the computer-executable instructions stored in the storage medium are executed by the processor, acquiring an identification code in a target application in a system UI includes:

acquiring the identification code in the target application at a predetermined time interval;

and/or acquiring the identification code in the target application when a user launches the target application.

Optionally, when the computer-executable instructions stored in the storage medium are executed by the processor, the aforementioned method further includes:

receiving an operation performed by the user on the terminal device; and performing an enlarging operation on a predetermined region in the identification code in response to the operation.

Optionally, when the computer-executable instructions stored in the storage medium are executed by the processor, the identification code includes any one of the following:

a 2D code, a bar code, a pattern formed by at least a 2D code and a logo pattern of the target application, a pattern formed by at least a bar code and the logo pattern of the target application, and an arrangement trajectory of icons of multiple predetermined applications located in the system UI.

Optionally, when the computer-executable instructions stored in the storage medium are executed by the processor, the aforementioned method further includes:

receiving first prompt information pushed by a server indicating that the identification code is successfully identified; and displaying the first prompt information in the system UI;

or receiving second prompt information pushed by the server indicating that the identification code has expired; and displaying the second prompt information in the system UI.

When the computer-executable instructions stored in the storage medium provided in one embodiment are executed by a processor, an identification code in a target application in a system UI is displayed in an icon-display region of the target application, such that when the identification code needs to be displayed, it is neither necessary to launch the target application nor to search for the identification code in a menu bar of the target application, and only an icon of the target application needs to be displayed. Thus, it is convenient for a user to display the identification code of the target application, and the operation is simple, convenient, and less time-consuming.

Further, one embodiment of the present application further provides a storage medium, for storing computer-executable instructions. In one specific embodiment, the storage medium may be a USB flash disk, an optical disk, a hard disk, or the like. When the computer-executable instructions stored in the storage medium are executed by a processor, the following process can be implemented:

acquiring an identification code in a target application in a system UI, where the identification code is generated by the target application according to user information in the target application; and displaying the identification code in a specified display region in the system UI.

Optionally, when the computer-executable instructions stored in the storage medium are executed by the processor, displaying the identification code in a specified display region in the system UI includes:

displaying the identification code in an icon-display region of the target application in the system UI;

or displaying the identification code on a wallpaper of the system UI.

Optionally, when the computer-executable instructions stored in the storage medium are executed by the processor, the identification code includes any one of the following:

a 2D code, a bar code, a pattern formed by at least a 2D code and a logo pattern of the target application, a pattern formed by at least a bar code and the logo pattern of the target application, and an arrangement trajectory of icons of a plurality of predetermined applications located in the system UI.

Optionally, when the computer-executable instructions stored in the storage medium are executed by the processor, the aforementioned method further includes:

receiving an operation performed by the user on the terminal device; and performing an enlarging operation on a predetermined region in the identification code in response to the operation.

When the computer-executable instructions stored in the storage medium provided in one embodiment are executed by a processor, an identification code of a target application is displayed in a specified region in a system UI, such that when the identification code needs to be displayed, it is neither necessary to launch the target application nor to search for the identification code in the menu of the target application, and only a page currently displayed by a terminal device needs to be switched to the system UI displaying the identification code. Thus, the operation is simple, convenient, and less time-consuming.

Further, one embodiment of the present application further provides a storage medium, for storing computer-executable instructions. In one specific embodiment, the storage medium may be a USB flash disk, an optical disk, a hard disk, or the like. When the computer-executable instructions stored in the storage medium are executed by a processor, the following process can be implemented:

displaying, in an icon-display region of a target application in a system UI, an identification code in the target application.

The identification code is generated by the target application according to user information in the target application.

Optionally, when the computer-executable instructions stored in the storage medium are executed by the processor, before displaying, in an icon-display region of a target application in a system UI, an identification code in the target application, the method further includes:

acquiring the identification code in the target application in the system UI.

When the computer-executable instructions stored in the storage medium provided in one embodiment are executed by a processor, an identification code in a target application in a system UI is displayed in an icon-display region of the target application, such that when the identification code needs to be displayed, it is neither necessary to launch the target application nor to search for the identification code in a menu bar of the target application, and only an icon of the target application needs to be displayed. Thus, it is convenient for a user to display the identification code of the target application, and the operation is simple, convenient, and less time-consuming.

Further, one embodiment further provides a storage medium, for storing computer-executable instructions. In one specific embodiment, the storage medium may be a USB flash disk, an optical disk, a hard disk, or the like. When the computer-executable instructions stored in the storage medium are executed by a processor, the following process can be implemented:

displaying, in a specified region in a system UI, an identification code in a target application.

The identification code is generated by the target application according to user information in the target application.

Optionally, when the computer-executable instructions stored in the storage medium are executed by the processor, before displaying, in a specified region in a system UI, an identification code in a target application, the method further includes:

acquiring the identification code in the target application in the system UI.

Optionally, when the computer-executable instructions stored in the storage medium are executed by the processor, displaying, in a specified region in a system UI, an identification code in a target application further includes:

displaying the identification code in an icon-display region of the target application in the system UI;

or displaying the identification code on a wallpaper of the system UI.

When the computer-executable instructions stored in the storage medium provided in one embodiment are executed by a processor, an identification code of a target application is displayed in a specified region in a system UI, such that when the identification code needs to be displayed, it is neither necessary to launch the target application nor to search for the identification code in a menu bar of the target application, and only a page currently displayed by a terminal device needs to be switched to the system UI displaying the identification code. Thus, the operation is simple, convenient, and less time-consuming.

In the 1990s, whether a technical improvement is a hardware improvement (for example, an improvement on a circuit structure such as a diode, a transistor, or a switch) or a software improvement (an improvement on a method procedure) can be differentiated clearly. However, following the development of technologies, currently many improvements on method procedures can be regarded as direct improvements on hardware circuit structures. Almost all designers can program an improved method procedure into a hardware circuit to obtain a corresponding hardware circuit structure. Therefore, it cannot be said that an improvement on a method procedure cannot be implemented by a hardware entity module. For example, a programmable logic device (PLD) (e.g., a field programmable gate array (FPGA)) is such an integrated circuit, whose logic function is determined by device programming of a user. The designers may program by themselves to "integrate" a digital system with a PLD, and there is no need to ask a chip manufacturer to design and manufacture an application specific integrated circuit chip. Furthermore, instead of manually manufacturing an integrated circuit chip, such programming is often implemented by "logic compiler" software, which is similar to a software compiler used in program development and writing. Original code before compiling also needs to be written in a particular programming language, which is referred to as a hardware description language (HDL). There is not just one, but many types of HDLs, for example, ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language), among which VHDL (Very-High-Speed Integrated Circuit Hardware Description Language) and Verilog2 are the most commonly used nowadays. Those skilled in the art should also understand that a hardware circuit for implementing a logic method procedure may be easily obtained only by slightly logically programming the method procedure using the above several hardware description languages and programming the method procedure into an integrated circuit.

A controller may be implemented in any suitable manner. For example, the controller may be in the form of a microprocessor or processor and a computer-readable medium that stores computer-readable program code (for example, software or firmware) executable by the (micro) processor, logic gates, switches, an application specific integrated circuit (ASIC), a programmable logic controller, and an embedded microcontroller. The examples of the controller include, but are not limited to the following microcontrollers: ARC 625D, Atmel AT91SAM, Microchip PIC18F26K20, and Silicone Labs C8051F320. The memory controller may also be implemented as part of the control logic of the memory. Those skilled in the art also know that, in addition to implementing a controller by pure computer-readable program code, with a logic programming of method or steps, the controller may implement the same function in the form of a logic gate, a switch, an application specific integrated circuit, a programmable logic controller, an embedded microcontroller, or the like. Therefore, such a controller may be regarded as a hardware component, and an apparatus included therein for implementing various functions may be regarded as an internal structure of the hardware component. Or, the apparatus for implementing various functions can even be regarded as both a software module for implementing a method and a structure in a hardware component.

The system, apparatus, module, or unit illustrated in the aforementioned embodiments may be specifically implemented by a computer chip or an entity, or a product having a certain function. A typical implementation device is a computer. Specifically, the computer may be, for example, a personal computer, a laptop computer, a cell phone, a camera phone, a smartphone, a personal digital assistant, a media player, a navigation device, an email device, a game console, a tablet computer, a wearable device, or a combination of any of these devices.

For the sake of convenient description, the above apparatus is functionally divided into various units, which are separately described. Certainly, when implementing the present application, the functions of various units may be implemented in one or a plurality of instances of software and/or hardware.

The present application is described with reference to flowcharts and/or block diagrams of a method, a device (system), and a computer program product according to embodiments of the present application. It should be understood that each flow and/or block in the flowcharts and/or block diagrams and a combination of the flows and/or blocks in the flowcharts and/or block diagrams may be implemented by computer program instructions. These computer program instructions may be provided to a processor of a general-purpose computer, a special-purpose computer, an embedded processor, or any other programmable data processing device to produce a machine, such that instructions executed by the processor of the computer or other programmable data processing device generate an apparatus for implementing a specified function in one or a plurality of procedures in the flowcharts and/or one or a plurality of blocks in the block diagrams.

These computer program instructions may also be stored in a computer-readable memory that can direct a computer or any other programmable data processing device to operate in a particular manner, so that the instructions stored in the computer-readable memory produce an article of manufacture including an instruction apparatus, the instruction apparatus implementing a specified function in one or a plurality of procedures in the flowcharts and/or one or a plurality of blocks in the block diagrams.

These computer program instructions may also be loaded onto a computer or any other programmable data processing device so that a series of operational steps are performed on the computer or other programmable device to produce computer-implemented processing, and thus the instructions executed on the computer or other programmable device provide the steps for implementing a specified function in one or a plurality of procedures in the flowcharts and/or one or a plurality of blocks in the block diagrams.

In a typical configuration, the computing device includes one or a plurality of processors (CPUs), input/output interfaces, network interfaces, and memories.

The memory may include a computer-readable medium in the form of a non-permanent memory, a random access memory (RAM) and/or a non-volatile memory or the like, such as a read-only memory (ROM) or a flash memory (flash RAM). The memory is an example of a computer-readable medium.

The computer-readable medium includes permanent and non-permanent, movable and non-movable media that can achieve information storage by means of any methods or techniques. The information may be computer-readable instructions, data structures, program modules, or other data. Examples of a storage medium of a computer include, but are not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storage devices, a cassette tape, a magnetic tape/magnetic disk storage or other magnetic storage devices, or any other non-transmission medium, and can be used to store information accessible by a computing device. According to the definitions herein, the computer-readable medium does not include transitory computer-readable media (transitory media), such as a modulated data signal and a carrier wave.

It should further be noted that the term "include," "comprise," or any other variation thereof is intended to encompass a non-exclusive inclusion, such that a process, method, commodity, or device that includes a series of elements includes not only those elements but also other elements not explicitly listed, or elements that are inherent to such a process, method, commodity, or device. The element defined by the statement "including one . . . ," without further limitation, does not preclude the presence of additional identical elements in the process, method, commodity, or device that includes the element.

Those skilled in the art should understand that embodiments of the present application may be provided as a method, a system, or a computer program product. Therefore, the present application may use the form of a full hardware embodiment, a full software embodiment, or an embodiment combining software and hardware. Moreover, the present application may use the form of a computer program product implemented on one or a plurality of computer-usable storage media (including, but not limited to, a magnetic disk memory, a CD-ROM, an optical memory, and so on) containing computer-usable program code therein.

The present application may be described in a general context of computer-executable instructions executed by a computer, such as a program module. Generally, the program module includes routines, programs, objects, components, data structures, and so on, for executing particular tasks or implementing particular abstract data types. The present application may also be implemented in distributed computing environments. In the distributed computing environments, tasks are executed by remote processing devices that are connected through a communication network. In a distributed computing environment, the program module may be located in local and remote computer storage media including storage devices.

The embodiments in the present specification are described in a progressive manner, and for identical or similar parts between different embodiments, reference may be made to each other so that each of the embodiments focuses on differences from other embodiments. Especially, the system embodiment is described relatively briefly, because it is substantially similar to the method embodiments, and for related parts, reference may be made to the method embodiments.

The above descriptions are merely the embodiments of the present application, and are not intended to limit the present application. For those skilled in the art, the present application may have various alterations and changes. Any modifications, equivalent substitutions, improvements and the like made within the spirit and principle of the present application shall fall within the scope of the claims of the present application.

What is claimed is:

1. A method for displaying a user-identification code, the method comprising:
   obtaining a user-identification code generated by a target application for a user; and
   displaying the user-identification code in a system user interface (UI) together with an icon corresponding to an application different from the target application, thereby allowing the user to present the system UI to a scanning device for scanning of the user-identification code, the icon being different from a user-identification code.

2. The method of claim 1, wherein the user-identification code is generated by the target application according to user information associated with the user stored in the target application, and wherein the method further comprises:
   when the user information in the target application changes, updating the user-identification code according to the changed user information, and displaying the updated user-identification code in the system UI.

3. The method of claim 1, wherein obtaining the user-identification code comprises:
   obtaining the user-dentification code from the target application at a predetermined time interval; or
   obtaining the user-dentification code from the target application when the user launches the target application.

4. The method of claim 1, further comprising:
   in response to receiving an operation performed by the user on a terminal device, enlarging a predetermined region in the user-identification code.

5. The method of claim 1, wherein the user-identification code comprises any one of the following:
   a two-dimensional (2D) code, a bar code, a pattern formed by at least a two-dimensional code and a logo pattern of the target application, a pattern formed by at least a bar code and the logo pattern of the target application, and an arrangement trajectory of icons of a plurality of predetermined applications located in the system UI.

6. The method of claim 1, further comprises:
   receiving first prompt information pushed by a server indicating that the user-identification code is successfully identified; and
   displaying the first prompt information in the system UI; or
   receiving second prompt information pushed by the server indicating that the user-identification code has expired; and
   displaying the second prompt information in the system UI.

7. The method of claim 1, wherein displaying the user-identification code in the system UI comprises:

modifying the system UI by replacing a target icon representing the target application with the user-identification code; or displaying the identification code on a wallpaper of the system UI.

8. An apparatus for displaying a user-identification code, the apparatus comprising:

a code-obtaining module configured to obtain a user-identification code generated by a target application for a user; and a display module configured to display the user-identification code in a system user interface (UI) together with an icon corresponding to an application different from the target application, thereby allowing the user to present the system UI to a scanning device for scanning of the user-identification code, the icon being different from a user-identification code.

9. The apparatus of claim 8, further comprising an update module, wherein the user-identification code is generated by the target application according to user information associated with the user stored in the target application, wherein the update module is configured to update the user-identification code according to the changed user information, and wherein the display module is further configured to display the updated user-identification code in the system UI.

10. The apparatus of claim 8, wherein the code-obtaining module is configured to:

obtain the user-dentification code from the target application at a predetermined time interval; or obtain the user-dentification code from the target application when the user launches the target application.

11. The apparatus of claim 8, wherein the identification code comprises any one of the following:

a two-dimensional (2D) code, a bar code, a pattern formed by at least a two-dimensional code and a logo pattern of the target application, a pattern formed by at least a bar code and the logo pattern of the target application, and an arrangement trajectory of icons of a plurality of predetermined applications located in the system UI.

12. The apparatus of claim 8, wherein the display module is further configured to:

in response to receiving first prompt information pushed by a server indicating that the user-identification code is successfully identified, display the first prompt information in the system UI; or in response to receiving second prompt information pushed by the server indicating that the user-identification code has expired, display the second prompt information in the system UI.

13. The apparatus of claim 8, wherein the display module is further configured to:

modify the system UI by replacing a target icon representing the target application with the user-identification code; or displaying the identification code on a wallpaper of the system UI.

14. A device for displaying a user-identification code, comprising:

a processor; and a memory configured to store computer-executable instructions, which when executed by the processor causing the processor to perform a method, the method comprising:

obtaining a user-identification code generated by a target application for a user; and displaying the user-identification code in a system user interface (UI) together with an icon corresponding to an application different from the target application, thereby allowing the user to present the system UI to a scanning device for scanning of the user-identification code, the icon being different from a user-identification code.

15. The device of claim 14, wherein the user-identification code is generated by the target application according to user information associated with the user stored in the target application, and wherein the method further comprises:

when the user information in the target application changes, updating the user-identification code according to the changed user information, and displaying the updated user-identification code in the system UI.

16. The device of claim 14, wherein obtaining the user-identification code comprises:

obtaining the user-dentification code from the target application at a predetermined time interval; or obtaining the user-dentification code from the target application when the user launches the target application.

17. The device of claim 14, wherein the method further comprises:

in response to receiving an operation performed by the user on a terminal device, enlarging a predetermined region in the user-identification code.

18. The device of claim 14, wherein the user-identification code comprises any one of the following:

a two-dimensional (2D) code, a bar code, a pattern formed by at least a two-dimensional code and a logo pattern of the target application, a pattern formed by at least a bar code and the logo pattern of the target application, and an arrangement trajectory of icons of a plurality of predetermined applications located in the system UI.

19. The device of claim 1, wherein the method further comprises:

receiving first prompt information pushed by a server indicating that the user-identification code is successfully identified; and displaying the first prompt information in the system UI; or receiving second prompt information pushed by the server indicating that the user-identification code has expired; and displaying the second prompt information in the system UI.

20. The device of claim 14, wherein displaying the user-identification code in the system UI comprises:

modifying the system UI by replacing a target icon representing the target application with the user-identification code; or displaying the identification code on a wallpaper of the system UI.

* * * * *